(12) United States Patent
Takatsuka et al.

(10) Patent No.: US 10,406,926 B2
(45) Date of Patent: Sep. 10, 2019

(54) BATTERY SELECTION DEVICE, BATTERY SELECTION METHOD, BATTERY SELECTION PROGRAM, AND RECORDING MEDIUM

(71) Applicant: OMRON Corporation, Kyoto (JP)

(72) Inventors: Hiromasa Takatsuka, Kyoto (JP); Kazuki Kasai, Kyoto (JP); Taiji Yoshikawa, Kyoto (JP); Koji Takizawa, Kyoto (JP); Yoshiyuki Morita, Kyoto (JP)

(73) Assignee: OMRON Corporation, Kyoto (JP)

( * ) Notice: Subject to any disclaimer, the term of this patent is extended or adjusted under 35 U.S.C. 154(b) by 85 days.

(21) Appl. No.: 15/554,968

(22) PCT Filed: Jan. 13, 2016

(86) PCT No.: PCT/JP2016/050874
§ 371 (c)(1),
(2) Date: Aug. 31, 2017

(87) PCT Pub. No.: WO2016/143374
PCT Pub. Date: Sep. 15, 2016

(65) Prior Publication Data
US 2018/0043785 A1 Feb. 15, 2018

(30) Foreign Application Priority Data

Mar. 12, 2015 (JP) ................. 2015-049608

(51) Int. Cl.
*H02J 7/00* (2006.01)
*B60L 11/18* (2006.01)
(Continued)

(52) U.S. Cl.
CPC ........... *B60L 11/1822* (2013.01); *B60L 53/80* (2019.02); *H01M 10/42* (2013.01);
(Continued)

(58) Field of Classification Search
CPC ............... B60L 11/1822; H01M 10/42; H01M 10/4207; H01M 10/44; H01M 10/441;
(Continued)

(56) References Cited

U.S. PATENT DOCUMENTS 6,154,006 A 11/2000 Hatanaka et al.
2002/0167293 A1* 11/2002 Ptasinski ............ G01R 31/3648
320/132

(Continued)

FOREIGN PATENT DOCUMENTS

| JP | H-11-150809 A | 6/1999 |
| JP | 2012-006591 A | 1/2012 |
| JP | 2013-090360 A | 5/2013 |

OTHER PUBLICATIONS

Search Report issued in European Application No. 16761346.2, dated Mar. 5, 2018 (7 pages).

(Continued)

*Primary Examiner* — Zixuan Zhou
(74) *Attorney, Agent, or Firm* — Osha Liang LLP

(57) ABSTRACT

A battery selection device has a preparation amount information acquisition component, a supply amount information acquisition component, a battery candidate extraction component, and a determination processor. The preparation amount information acquisition component acquires preparation amount information indicating the scheduled date and time of a loan and the required charge amount. The supply amount information acquisition component acquires supply amount information indicating the full charge power capacity and the current charge amount of each battery. On the basis of the preparation amount information and the supply amount information, the battery candidate extraction component selects loaner battery candidates, which are batteries that can be charged to the required charge amount by the scheduled date and time of the loan. The determination (Continued)

processor picks out a loaner battery on the basis of the predicted progress of deterioration of batteries.

17 Claims, 11 Drawing Sheets

(51) Int. Cl.
| | |
|---|---|
| *H01M 10/42* | (2006.01) |
| *H01M 10/44* | (2006.01) |
| *H01M 10/48* | (2006.01) |
| *H02J 7/02* | (2016.01) |
| *B60L 53/80* | (2019.01) |
| *B60L 50/50* | (2019.01) |

(52) U.S. Cl.
CPC ....... *H01M 10/4207* (2013.01); *H01M 10/44* (2013.01); *H01M 10/441* (2013.01); *H01M 10/48* (2013.01); *H01M 10/482* (2013.01); *H02J 7/007* (2013.01); *H02J 7/0013* (2013.01); *H02J 7/0021* (2013.01); *H02J 7/0027* (2013.01); *H02J 7/0047* (2013.01); *H02J 7/0052* (2013.01); *H02J 7/027* (2013.01); *B60L 50/50* (2019.02); *H01M 2220/20* (2013.01); *H02J 2007/005* (2013.01)

(58) Field of Classification Search
CPC .... H01M 10/48; H01M 10/482; H02J 7/0013; H02J 7/0021; H02J 7/0027; H02J 7/0047; H02J 7/0052; H02J 7/007; H02J 7/027
USPC .................................. 320/109, 162; 701/22
See application file for complete search history.

(56) References Cited

U.S. PATENT DOCUMENTS

| | | | |
|---|---|---|---|
| 2003/0209375 A1 | 11/2003 | Suzuki et al. | |
| 2010/0136390 A1* | 6/2010 | Ueda ................... | H01M 10/441 |
| | | | 429/61 |
| 2011/0156662 A1* | 6/2011 | Nakamura .......... | B60L 11/1822 |
| | | | 320/162 |
| 2014/0368156 A1 | 12/2014 | Aloe | |
| 2016/0071079 A1 | 3/2016 | Aloe | |

OTHER PUBLICATIONS

International Search Report issued in PCT/JP2016/050874 dated Mar. 15, 2016 (1 page).

* cited by examiner

| RESERVATION ID | SCHEDULED LOAN DATE AND TIME | REQUIRED CHARGE | REQUIRED NUMBER | LOAN SCHEDULED BATTERIES | UNDETERMINED NUMBER |
|---|---|---|---|---|---|
| A100 | 10 O'CLOCK ON MARCH 1, 2015 | 2000Wh | 1 | UNDETERMINED | 1 |
| A099 | 11 O'CLOCK ON MARCH 1, 2015 | 2000Wh | 2 | UNDETERMINED | 2 |
| A098 | 10 O'CLOCK ON MARCH 1, 2015 | 1800Wh | 1 | 「xyz」 | 0 |
| A097 | 10 O'CLOCK ON MARCH 1, 2015 | 1500Wh | 2 | 「abc」「def」 | 0 |
| ... | ... | ... | ... | ... | ... |

FIG. 3

| BATTERY ID | SOC | SOH |
|---|---|---|
| a | 40% | 85% (2040Wh) |
| b | 50% | 80% (1920Wh) |
| c | 10% | 100% (2400Wh) |
| d | 10% | 95% (2280Wh) |
| e | 80% | 95% (2280Wh) |

| BATTERY ID | RESERVATION ID: "A100" | | RESERVATION ID: "A099" | |
|---|---|---|---|---|
| | MINIMUM CHARGING TIME (2000 Wh) | 10 O'CLOCK | MINIMUM CHARGING TIME (2000 Wh) | 11' CLOCK |
| a | APPROXIMATELY 65 MINUTES | FAIL | APPROXIMATELY 65 MINUTES | PASS |
| b | — | FAIL | — | FAIL |
| c | APPROXIMATELY 25 MINUTES | PASS | APPROXIMATELY 25 MINUTES | PASS |
| d | APPROXIMATELY 26 MINUTES | PASS | APPROXIMATELY 26 MINUTES | PASS |
| e | APPROXIMATELY 3 MINUTES | PASS | APPROXIMATELY 3 MINUTES | PASS |

FIG. 6

| CANDIDATE NUMBER | FIRST CORRESPONDENCE INFORMATION | | SECOND CORRESPONDENCE INFORMATION | | THIRD CORRESPONDENCE INFORMATION | |
|---|---|---|---|---|---|---|
| | BATTERY ID | RESERVATION ID OF PREPARATION AMOUNT INFORMATION | BATTERY ID | RESERVATION ID OF PREPARATION AMOUNT INFORMATION | BATTERY ID | RESERVATION ID OF PREPARATION AMOUNT INFORMATION |
| 1 | c | A100 | a | A099 | d | A099 |
| 2 | c | A100 | a | A099 | e | A099 |
| 3 | c | A100 | d | A099 | e | A099 |
| 4 | d | A100 | a | A099 | c | A099 |
| 5 | d | A100 | a | A099 | e | A099 |
| 6 | d | A100 | c | A099 | e | A099 |
| 7 | e | A100 | a | A099 | c | A099 |
| 8 | e | A100 | a | A099 | d | A099 |
| 9 | e | A100 | c | A099 | d | A099 |

FIG. 7

| CANDIDATE INFORMATION FOR LOANER BATTERY CANDIDATES | DETERIORATION PREDICTED VALUE |
|---|---|
| CANDIDATE INFORMATION FOR CANDIDATE NUMBER "1" | 3.315Wh |
| CANDIDATE INFORMATION FOR CANDIDATE NUMBER "2" | 4.789Wh |
| CANDIDATE INFORMATION FOR CANDIDATE NUMBER "3" | 10.80Wh |
| CANDIDATE INFORMATION FOR CANDIDATE NUMBER "4" | 1.82Wh |
| ... | ... |

FIG. 8

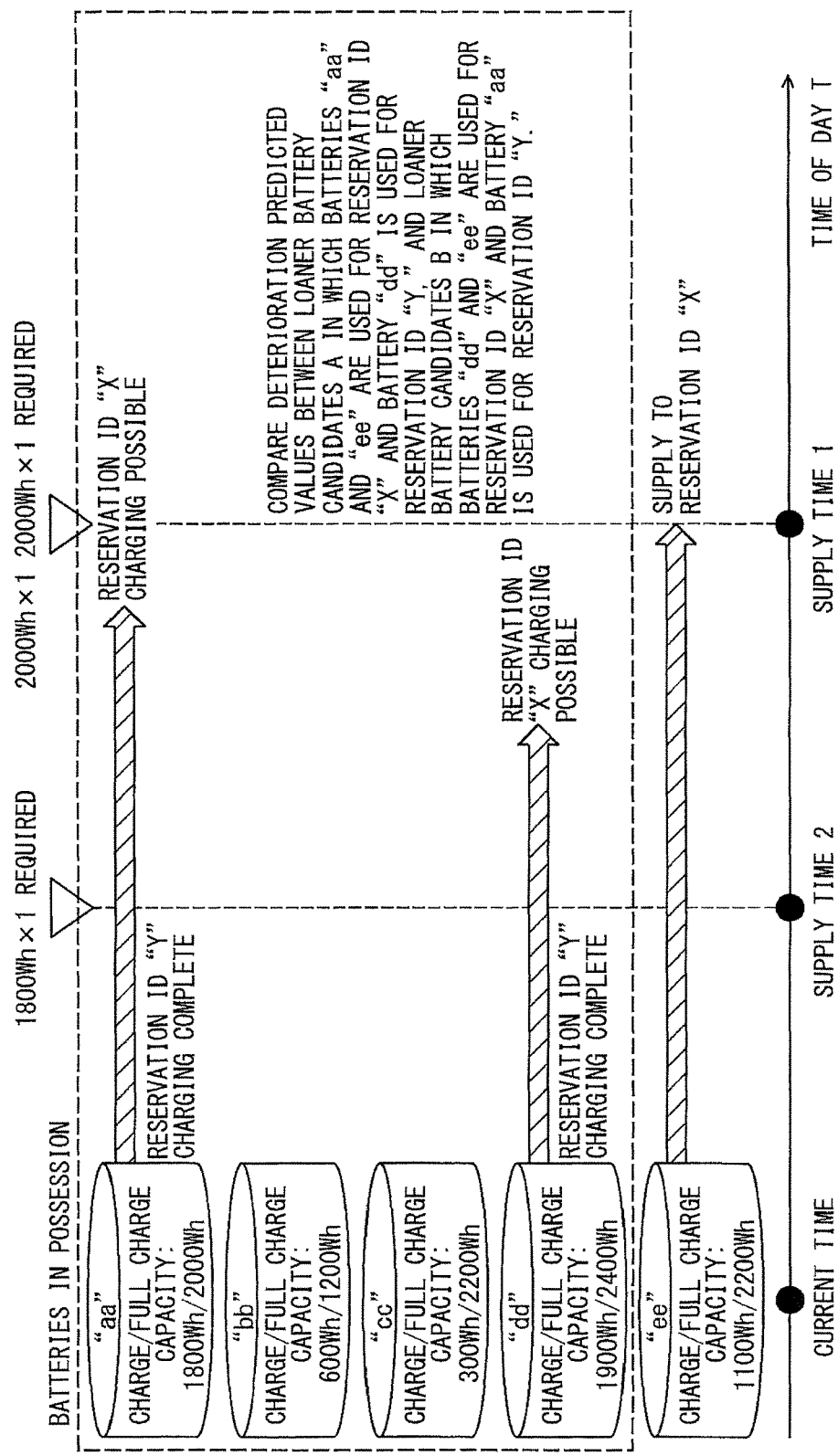

BATTERY SELECTION DEVICE, BATTERY SELECTION METHOD, BATTERY SELECTION PROGRAM, AND RECORDING MEDIUM

CROSS-REFERENCE TO RELATED APPLICATIONS

This application claims the benefit of Japanese Application No. JP2015-049608, filed Mar. 12, 2015 and International Application PCT/JP2016/050874, filed Jan. 13, 2016, both of which are incorporated herein by reference in their entirety.

TECHNICAL FIELD

The present invention generally relates to a battery selection device, a battery selection method, a battery selection program, and a recording medium, with which a battery to be charged is selected from among a plurality of batteries in a charging station.

BACKGROUND

Electric vehicles, typified by electric cars, are equipped with rechargeable batteries, and with an electric vehicle the battery is charged at home, at one of the charging stations installed at various locations, or the like.

The battery deteriorates over repeating charging. Patent Literature 1 discloses a charging control device that performs charging by taking into account the deterioration of the battery. The charging control device described in Patent Literature 1 comprises a battery deterioration analyzer that selects the influence that the battery charging rate and the charge amount have on deterioration as a deterioration influence coefficient, and performs charging by setting the charging rate and the charge amount so as to minimize this deterioration influence coefficient. This suppresses deterioration of the battery due to charging.

Incidentally, recent years have seen the proposal of a battery exchange system (battery swap system) in which, when the battery in an electric car or other such electric vehicle goes dead, in order to reduce the waiting time for the user, the battery with a low charge installed in the electric vehicle is exchanged for a battery that has been previously charged, instead of charging the battery with the low charge while it is still installed in the electric vehicle (see Patent Literature 2, for example).

CITATION LIST

Patent Literature

Patent Literature 1: Japanese Laid-Open Patent Application 2013-90360 (disclosed on May 13, 2013)
Patent Literature 2: Japanese Laid-Open Patent Application 2012-6591 (disclosed on Jan. 12, 2012)

SUMMARY

With the charging station used in a battery swap system, the returned battery is charged to be loaned out to the next customer. A charging station used in a battery swap system has a plurality of batteries so that the batteries can be loaned out to a plurality of users, and the remaining capacity of returned batteries varies depending how they were used by the users. For example, let us assume that a battery A with a large remaining capacity and a battery B with a low remaining capacity have been returned. At this point, if the time from return to the next loan-out is relatively short, battery A will have to be quick-charged so that it can be loaned out, and this tends to exacerbate deterioration. On the other hand, if battery B is used for this loan, it will require less quick charging than battery A.

Thus, with a charging station in a battery swap system, the choice of which of the batteries that have been returned will be charged is expected to affect the deterioration of the batteries in the charging station. However, Patent Literature 2 does not take this into account whatsoever.

Also, the technique described in Patent Literature 1 is premised on the assumption that the electric vehicle and the battery are in one-to-one correspondence, and does not take into consideration the overall deterioration of the batteries in the charging station of the battery swap system.

One or more embodiments of the present invention provide a battery selection device, a battery selection method, a program, and a recording medium with which a plurality of batteries in the charging station of a battery swap system can be selected for charging so that the battery that will undergo the least deterioration during charging can be selected, taking into account how much deterioration progresses during quick charging or other charging, for example.

In one or more embodiments, a battery selection device that selects which battery to charge from among a plurality of batteries in a charging station at a time of selection comprises a supply amount information acquisition component, a preparation amount information acquisition component, a battery extraction component, and a determination component. The supply amount information acquisition component acquires supply amount information including information about a full charge capacity and a remaining capacity at the time of selection for each of the plurality of batteries. The preparation amount information acquisition component acquires preparation amount information indicating a preparation remaining capacity, which is the remaining capacity required of a loaner battery when that battery is loaned out at a scheduled loan time that is after the time of selection. The battery extraction component extracts as loaner battery candidates those batteries that can be charged up to the preparation remaining capacity by the scheduled loan time, from among the plurality of batteries, on the basis of the supply amount information and the preparation amount information. The determination component determines a loaner battery on the basis of a predicted progress of deterioration of batteries as a result of charging the loaner battery candidates up to the preparation remaining capacity by the scheduled loan time when there are a plurality of loaner battery candidates, and determines that loaner battery for charging.

The battery selection method pertaining to one or more embodiments of the present invention is a battery selection method for selecting which of a plurality of batteries located in a charging station is to be charged at a time of selection, the battery selection method comprising a supply amount information acquisition step, a preparation amount information acquisition step, a battery extraction step, and a determination step. The supply amount information acquisition step involves acquiring supply amount information including information about a full charge capacity and a remaining capacity at the time of selection for each of the plurality of batteries. The preparation amount information acquisition step involves acquiring preparation amount information indicating a preparation remaining capacity, which is the remaining capacity required of a loaner battery when that battery is loaned out at a scheduled loan time that is after the time of selection. The battery extraction step involves extracting as loaner battery candidates those batteries that can be charged up to the preparation remaining capacity by the scheduled loan time, from among the plurality of batteries, on the basis of the supply amount information and the preparation amount information. The determination step involves determining a loaner battery on the basis of the predicted progress of deterioration of batteries as a result of charging the loaner battery candidates up to the preparation remaining capacity by the scheduled loan time when there are a plurality of loaner battery candidates, and determining that loaner battery for charging.

With the above configuration, the battery that will undergo the least deterioration during charging is selected for charging, taking into account the progress of deterioration during charging by quick charging or the like, for example, for the plurality of batteries included in the charging station of the battery swap system.

Further, with the battery selection device pertaining to one or more embodiments of the present invention, the scheduled loan time includes a first scheduled loan time and a second scheduled loan time, the preparation amount information acquisition component acquires, as preparation amount information, first preparation amount information indicating a first preparation remaining capacity, which is the remaining capacity required for a first loaner battery when that battery is loaned out at the first scheduled loan time, and second preparation amount information indicating a second preparation remaining capacity, which is the remaining capacity required for a second loaner battery when that battery is loaned out at the second scheduled loan time. The battery extraction component extracts, as loaner battery candidates, a first loaner battery candidate that is a battery that can be charged up to the first preparation remaining capacity by the first scheduled loan time, and a second loaner battery candidate that is a battery that can be charged up to the second preparation remaining capacity by the second scheduled loan time, from among the plurality of batteries, on the basis of the supply amount information and the preparation amount information. On the condition that the first loaner battery and the second loaner battery will be determined so as to be mutually different batteries, when there are a plurality of first loaner battery candidates, the determination component determines the first loaner battery on the basis of the predicted progress of deterioration of these first loaner battery candidates when they are charged up to the first preparation remaining capacity by the first scheduled loan time, and when there are a plurality of second loaner battery candidates, the determination component determines the second loaner battery on the basis of the predicted progress of deterioration of these second loaner battery candidates when they are charged up to the second preparation remaining capacity by the second scheduled loan time.

With the above configuration, when the scheduled loan time includes a first scheduled loan time and a second scheduled loan time, the progress of battery deterioration during charging by quick charging or the like can be taken into account for a plurality of batteries in the charging station, so that loaner batteries corresponding to various scheduled loan times can be determined, and the determined loaner battery can be charged.

Furthermore, with the battery selection device pertaining to one or more embodiments of the present invention, the plurality of batteries in the selection group may or may not include a battery that has already been determined for charging by a previous selection at the scheduled loan time. Alternatively, the plurality of batteries in the selection group may include a battery that has already been determined for charging by a previous selection and has already started charging at the scheduled loan time.

If batteries that have already been determined for charging by a previous selection are not included in the plurality of batteries in the selection group, the burden of selection processing can be reduced. On the other hand, if batteries that have already been determined for charging by a previous selection are included in the plurality of batteries in the selection group, there will be a wider selection of batteries for charging, so the progress of deterioration of the batteries in the charging station can be further suppressed. Similarly, if batteries that have already been determined for charging by a previous selection and that have already begun charging are included in the plurality of batteries in the selection group, there will be a wider range of selection batteries for charging. Therefore, the progress of deterioration of the batteries in the charging station can be further suppressed.

Furthermore, with the battery selection device pertaining to one or more embodiments of the present invention, the preparation amount information acquisition component acquires the preparation amount information by taking over the preparation amount information for batteries that have already been determined for charging in a previous selection. The above configuration reduces the burden on the preparation amount information acquisition component.

If a battery that has already been determined for charging in a previous selection is determined for charging, the determination component may discard this previous determination.

Also, with the battery selection device pertaining to one or more embodiments of the present invention, the battery extraction component outputs an error notification in the event that a loaner battery candidate cannot be selected.

With the above configuration, a charging station worker who receives an error notification can deal with it by putting in some new batteries, etc.

The battery selection device pertaining to one or more embodiments of the present invention may be realized by a computer.

In this case, the program of the battery selection device that causes the battery selection device to be realized by a computer by having the computer operate as the various components (software elements) provided to the battery selection device, as well as a recording medium that can be read by a computer, to which this program is recorded, fall within the scope of one or more embodiments of the present invention.

One or more embodiments of the present invention advantageously allow the battery with the least deterioration during charging to be selected for charging, from among a plurality of batteries in the charging station of a battery swap system, by taking into account the progress of deterioration during charging by quick charging or the like, for example.

BRIEF DESCRIPTION OF THE DRAWINGS

FIG. 3 is a diagram showing an example of one or more embodiments of the preparation amount information acquired by a preparation amount information acquisition component provided to the battery selection device shown in FIG. 1;

FIG. 6 is a diagram showing an example of one or more embodiments of the minimum charging time calculated by a battery candidate extraction component provided to the battery selecting device shown in FIG. 1;

FIG. 7 is a diagram showing one or more embodiments of the candidate information about battery candidates generated by a battery candidate extraction component provided to the battery selection device shown in FIG. 1;

FIG. 8 is a diagram showing an example of one or more embodiments of a feature amount calculated by a deterioration predicted value calculator provided to the battery selection device shown in FIG. 1;

FIG. 12 is a diagram showing processing for determining a battery to be loaned out in second selection processing of the battery selection device in one or more embodiments.

DETAILED DESCRIPTION

Configuration of Charging Station 100

Figure 1:
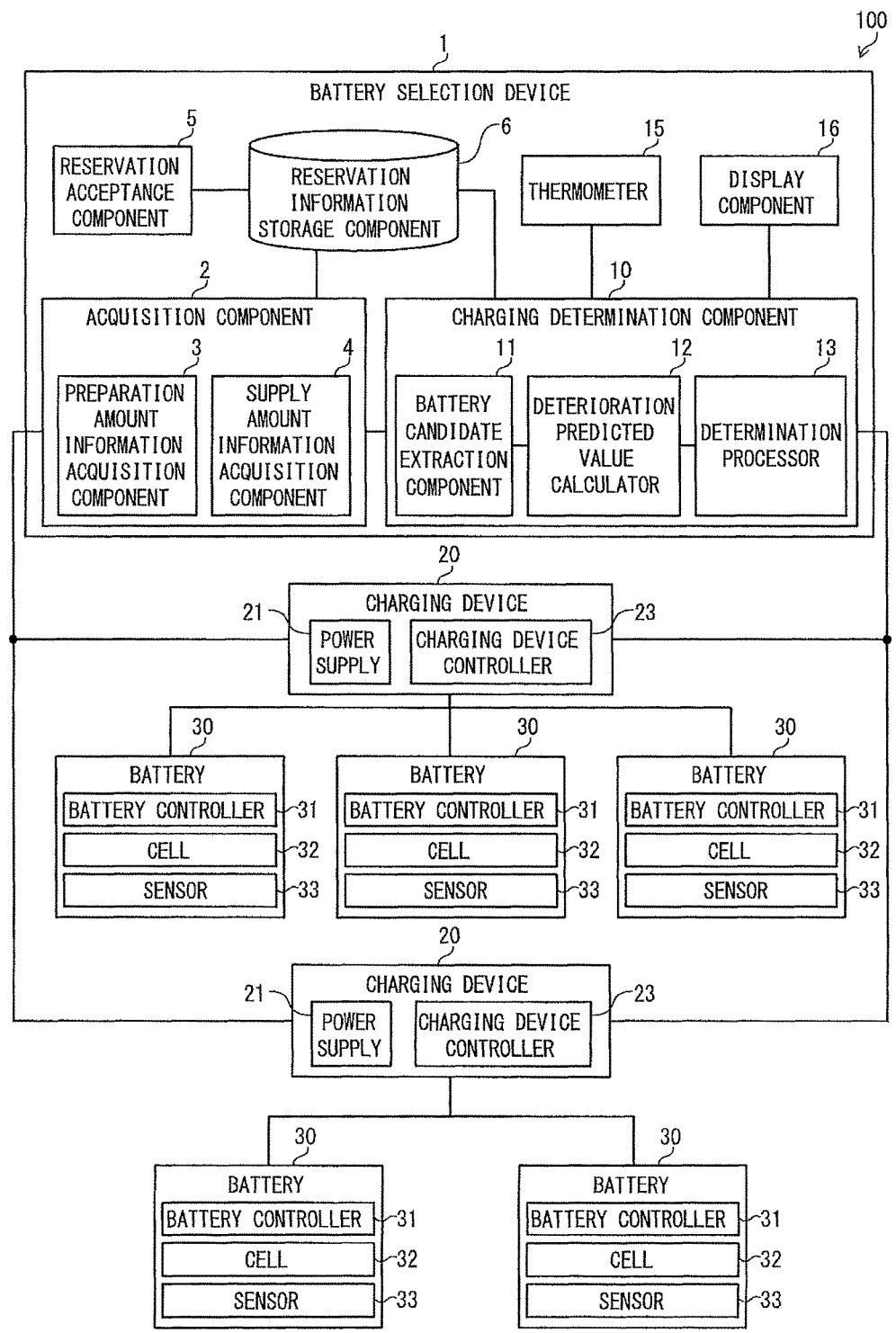
FIG. 1 is a block diagram of the configuration of a charging station comprising the battery selection device in one or more embodiments of the present invention.

One or more embodiments of the present invention will now be described in detail through reference to the drawings. FIG. 1 is a block diagram of the configuration of a charging station 100 comprising a battery selection device 1 pertaining to one or more embodiments.

The charging station 100 is used to loan out batteries 30 for electric cars and other such electric vehicles, accepts the return of batteries 30 from electric vehicles, and charges the batteries 30 that are in the charging station 100. As shown in FIG. 1, the charging station 100 comprises a battery selection device 1, charging devices 20, and batteries 30.

FIG. 1 shows an example in which there are two charging devices 20 and five batteries 30, but the numbers of charging devices 20 and batteries 30 are not limited to these.

Batteries 30

The batteries 30 each comprise a battery controller 31, a cell 32, and a sensor 33. When a battery 30 is returned by the user, it is connected to a charging device 20, and the cell 32 is charged from the charging device 20. The sensor 33 can be any of various sensors such as a current sensor, a power sensor, a voltage sensor, or a temperature sensor. The various sensors are used to measure various information related to the cell 32. The measurement result is supplied to the battery controller 31. The battery controller 31 of each battery 30 produces battery information corresponding to the SOC (state of charge), which indicates the remaining capacity of the battery 30, the SOH (state of health), which indicates the state of deterioration of the battery 30, and the battery ID (battery identification information) used to identify the battery 30, based on information from the sensor 33 and in response to a battery information acquisition request from the charging device 20, and outputs the results to the charging device 20.

Charging Device 20

The charging device 20 is connected to the battery selection device 1 and to the battery 30 returned from an electric vehicle, and comprises a power supply 21 and a charging device controller 23.

The charging device controller 23 controls the operation of the power supply 21 on the basis of an instruction from the battery selection device 1. More specifically, the charging device controller 23 receives from the battery selection device 1 a charging instruction that includes a battery ID for identifying the battery 30 to be charged, and charging target information indicating a charging target for that battery 30. The charge target information here indicates the target charge and the date and time (target date and time) by which the target charge amount is to be reached. The charging device controller 23 controls the power supply 21 so that the charge of the battery 30 indicated by the battery ID included in the charging instruction will reach the target charge indicated by the charging target information by the target date and time indicated by the charging target information.

More specifically, upon receiving a charging instruction, the charging device controller 23 sends a battery information acquisition request to the battery 30 indicated by the battery ID included in the charging instruction, and acquires battery information. The charging device controller 23 then finds the charge amount from the rating (initial full charge capacity) and the SOC and SOH included in the battery information. Furthermore, the charging device controller 23 sets the charging current and the charging voltage on the basis of the charge amount thus found and the charging target information included in the charging instruction, and controls the power supply 21 so that the battery will be charged at the set charging current and charging voltage.

When the charging device controller 23 reaches the target date and time indicated by the charging target information for the received charging instruction, the charging device controller 23 displays on a display component (not shown) a notification indicating that the battery 30 with the battery ID included in the charging instruction has been charged. The charging device controller 23 then disconnects the battery 30 from the charging device 20.

Upon receiving an instruction to transmit battery information from the battery selection device 1, the charging device controller 23 outputs a battery information acquisition request to the connected battery 30, and outputs the battery information received from the battery 30 to the battery selection device 1.

Under the control of the charging device controller 23, the power supply 21 charges the cell 32 by supplying electricity to the battery 30 that is connected to the charging device 20 and has been determined as the one to be charged.

Battery Selection Device 1

The battery selection device 1 determines a battery 30 to be loaned out from among a plurality of batteries 30 in the selection group in the charging station, and performs selection processing to select the determined battery 30 as the one to be charged.

The battery selection device 1 comprises an acquisition component 2, a reservation acceptance component 5, a reservation information storage component 6, a charging determination component 10, a display component 16, and a thermometer 15.

The display component 16 is a device for displaying images indicating various information, such as a liquid crystal display or an organic EL display. The thermometer 15 measures the temperature inside the charging station 100.

The reservation information storage component 6 stores a reservation table related to lending reservations for the batteries 30. The reservation information storage component 6 is a hard disk or semiconductor memory that holds information handled by the battery selection device 1.

FIG. 3 is a diagram showing an example of the reservation table stored in the reservation information storage component 6. As shown in FIG. 3, the reservation information storage component 6 stores a reservation table in which reservation IDs for identifying reservation inputs, scheduled lending dates and times for the batteries 30, and storage amounts (remaining capacities) necessary for the batteries 30 (hereinafter referred to as the required storage amounts), the number of required batteries 30 (hereinafter referred to as the required number), battery IDs for identifying batteries that are scheduled to be loaned out (hereinafter referred to as a loan scheduled battery IDs), and the number of undetermined batteries 30 are associated with each other.

The loan scheduled battery ID here is a battery ID for identifying a battery 30 that is scheduled to be loaned out as determined by the charging determination component 10 in previous selection processing. In FIG. 3, when the column for loan scheduled battery ID says "undetermined," it means that the charging determination component 10 has not yet determined a battery 30 that is scheduled to be loaned out.

Also, the undetermined number column refers to the number of batteries 30 that have not been determined for scheduled loan, out of the required number. For example, in the record (reservation information) of the reservation ID "A100," no loan scheduled batteries 30 have been determined yet, and the unselected number is the same as the required number. Meanwhile, in the record of the reservation ID "A098," the battery 30 with the scheduled loan battery ID "xyz" has been determined as a battery 30 scheduled to be loaned out with the required number "1," and the undetermined number is "0."

The reservation acceptance component 5 accepts a reservation input by a user who wishes to borrow a battery 30. The reservation acceptance component 5 may accept reservation input via an input component (not shown) (such as a keyboard or a touch panel), or may accept reservation input via a communication network (not shown). The reservation acceptance component 5 accepts a reservation input including the scheduled loan date and time, the required storage amount, and the required number for the batteries 30.

For every reservation input received, the reservation acceptance component 5 produces a record (reservation information) in which a uniquely allocated reservation ID, the scheduled loan date and time, required storage amount, and required number included in that reservation input, the loan scheduled battery ID "undetermined," the required number included in that reservation input, and the undetermined number of this same number are associated with each other. The reservation acceptance component 5 then adds the record thus produced to the reservation table stored in the reservation information storage component 6.

The reservation acceptance component 5 constantly checks the reservation table stored in the reservation information storage component 6, and deletes any records in which the scheduled loan date and time are before the current point in time.

The acquisition component 2 is used to acquire a variety of information that is used to select the battery 30 to be charged, at a predetermined timing (such as every hour) or at the point when a worker at the charging station inputs a processing start instruction to an input component (not shown). The acquisition component 2 outputs the acquired information to the charging determination component 10. The acquisition component 2 comprises a preparation amount information acquisition component 3 and a supply amount information acquisition component 4.

The preparation amount information acquisition component 3 is a block that acquires preparation amount information indicating the required storage amount (preparation remaining capacity), which is the required remaining capacity of the battery 30 when lending the battery 30 is loaned out at the scheduled loan date and time included in the reservation input received by the reservation acceptance component 5.

More specifically, the preparation amount information acquisition component 3 selects, from the reservation table stored in the reservation information storage component 6, records whose undetermined is other than 0, and for each of the selected records, produces, as preparation amount information, information in which the required number, the required charge amount, the scheduled loan date and time, and the reservation ID included in the record are associated with each other. The preparation amount information acquisition component 3 then outputs the produced preparation amount information to the charging determination component 10.

The supply amount information acquisition component 4 is a block that acquires supply amount information including information about the stored charge amount and the full charge capacity at the current point in time, which is the time of selection, for each of the batteries 30 in the selection group.

More specifically, the supply amount information acquisition component 4 outputs a battery information transmission instruction to each of the charging devices 20. The supply amount information acquisition component 4 then acquires battery information for each battery 30 connected to a charging device 20, in which the battery ID for that battery, the SOC indicating the charge amount of that battery 30 at the current time, and the SOH indicating the full charge capacity in the deterioration state of that battery 30 at the current time are associated with each other. Also, the supply amount information acquisition component 4 reads all of the loan scheduled battery IDs other than "undetermined" from the reservation table stored in the reservation information storage component 6.

The supply amount information acquisition component 4 then specifies, as selection group battery information, battery information including battery IDs that are different from the loan scheduled battery IDs read from the reservation table, out of the battery information acquired from the charging device 20. Specifically, the supply amount information acquisition component 4 includes among the batteries in the selection group all batteries except the batteries 30 that have been determined as scheduled to be loaned out in previous selection processing (that is, batteries 30 that have already been selected for charging). The supply amount information acquisition component 4 then specifies battery information corresponding to each of the batteries 30 in this selection group as selection group battery information.

The supply amount information acquisition component 4 produces the specified selection group battery information as supply amount information indicating the amount of power that can be supplied at the current time (the time of selection), and outputs the supply amount information thus produced to the charging determination component 10.

Here, SOC and SOH are both expressed as a percentage, the product of the rating of the battery 30 and SOH indicates the full charge capacity of the battery in its current deterioration state, and the product of the full charge capacity and the SOC indicates the charge amount stored in the battery at the current time.

Figures 4, 5:
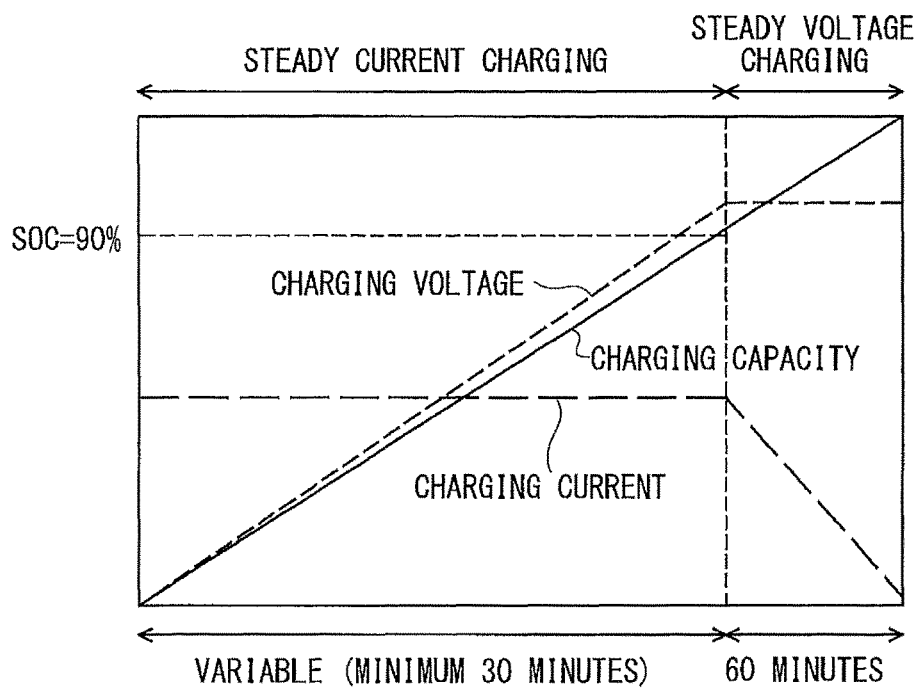
FIG. 4 is a diagram showing an example of one or more embodiments of the supply amount information acquired by a supply amount information acquisition component provided to the battery selection device shown in FIG. 1.
FIG. 5 is a graph of the relation between battery charge and charging time in one or more embodiments of the present invention.

FIG. 4 is a diagram showing an example of supply amount information generated by the supply amount information acquisition component 4. As shown in FIG. 4, for example, the supply amount information acquisition component 4 acquires supply amount information indicating "40%" as the current SOC of the battery 30 with the battery ID "a," and "85%" as the current SOH.

The charging determination component 10 determines, as a loan scheduled battery 30, a battery 30 that satisfies the required number, the scheduled loan date and time, and the required charge amount indicated by the preparation amount information outputted from the preparation amount information acquisition component 3, from among the batteries 30 indicated by the supply amount information outputted from the supply amount information acquisition component 4 (the batteries 30 in the selection group). The charging determination component 10 then earmarks for charging any loan scheduled batteries 30 that have been determined. The charging determination component 10 comprises a battery candidate extraction component 11, a deterioration predicted value calculator 12, and a determination processor (determination component) 13.

As discussed above, the charging determination component 10 receives preparation amount information in which the reservation ID, the scheduled loan date and time, the required charge amount, and the required number are associated with each other from the preparation amount information acquisition component 3. The charging determination component 10 also receives supply amount information in which the battery ID, the SOC, and the SOH are associated with each other from the supply amount information acquiring component 4.

The battery candidate extraction component 11 specifies satisfactory batteries 30, which are batteries capable of satisfying the required charge indicated by the preparation amount information at the scheduled loan date and time indicated by this preparation amount information, and are batteries 30 indicated by the battery ID included in the supply amount information, on the basis of this supply amount information that is outputted from the supply amount information acquisition component and the preparation amount information outputted from the preparation amount information acquisition component 3. The battery candidate extraction component 11 then extracts loaner battery candidates, which are the required number of batteries 30 that satisfy the required charge at the scheduled loan date and time.

For each of the batteries 30 included in the loaner battery candidates, the battery candidate extraction component 11 produces candidate information in which the battery IDs for identifying the batteries 30 are associated with the reservation IDs included in the preparation amount information satisfied by these batteries 30, for the selected loaner battery candidates. The battery candidate extraction component 11 then produces candidate information that summarizes the generated correspondence information. That is, when two or more batteries 30 are included in the loaner battery candidates, the battery candidate extraction component 11 produces candidate information including correspondence information corresponding to each battery 30.

Here, if the number of satisfactory batteries is larger than the required number, the battery candidate extraction component 11 extracts a plurality of loaner battery candidates.

The battery candidate extraction component 11 receives a plurality of sets of preparation amount information, and if certain batteries 30 are satisfactory batteries that satisfy a plurality of sets of preparation amount information, the selection of loaner battery candidates is performed by distinguishing loaner battery candidates in which those batteries 30 satisfy a certain preparation amount information from loaner battery candidates in which those batteries 30 satisfy other preparation amount information. For example, if a battery 30 with a battery ID of "a" and a battery 30 with a battery ID of "b" are both satisfactory batteries corresponding to preparation amount information with a reservation ID of "A100," and are also satisfactory batteries corresponding to preparation amount information with a reservation ID of "A009," the battery candidate extraction component 11 produces:

(1) candidate information that includes correspondence information in which the battery ID "a" is associated with the reservation ID "A100," and correspondence information in which the battery ID "b" is associated with the reservation ID "A009," and (2) candidate information that includes correspondence information in which the battery ID "b" is associated with the reservation ID "A100," and correspondence information in which the battery ID "a" is associated with the reservation ID "A099."

The method by which the battery candidate extraction component 11 extracts battery candidates will now be described in detail.

If no loaner battery candidate can be selected, that is, if there are no satisfactory batteries, or if the number of satisfactory batteries is less than the required number, the battery candidate extraction component 11 causes the display component 16 to display an error notification to the effect that no loaner battery candidates can be selected.

Also, if one or more loaner battery candidates have been selected, the battery candidate extraction component 11 outputs the candidate information produced for each loaner battery candidate to the deterioration predicted value calculator 12.

The deterioration predicted value calculator 12 calculates the predicted value for the degree of process in deterioration of the batteries 30 included in the loaner battery candidates (hereinafter referred to as the deterioration predicted value) that happens when the batteries 30 included in the loaner battery candidates are charged up to the required charge by the required date and time indicated by the preparation amount information, and does this for each loaner battery candidate.

In one or more embodiments, the deterioration predicted value calculator 12 uses the candidate information received from the battery candidate extraction component 11, the supply amount information and preparation amount information, and the temperature measured by the thermometer 15 to calculate a deterioration predicted value for each loaner battery candidate. The method for calculating the deterioration predicted value in one or more embodiments will be discussed in detail below. The deterioration predicted value calculator 12 produces, for each loaner battery candidate, deterioration prediction information in which the candidate information corresponding to that loaner battery candidate is associated with the deterioration predicted value calculated for that loaner battery candidate, and outputs the deterioration prediction information thus produced to the determination processor 13.

The determination processor 13 is used to determine batteries 30 to be charged. Upon receiving deterioration prediction information from the deterioration predicted value calculator 12, the determination processor 13 specifies the candidate information corresponding to the deterioration predicted value with the least degree of progress in deterioration as to-be-charged battery information. The determination processor 13 then determines the batteries 30 indicated by battery IDs included in the to-be-charged battery information as loaner batteries that are to be loaned out at the scheduled loan date and time indicated by the preparation amount information for the reservation IDs corresponding to those battery IDs. Furthermore, the determination processor 13 sets the determined loaner batteries as the batteries 30 that are to be charged.

More specifically, the determination processor 13 produces charging target information in which the target date and time and the target charge amount are respectively the scheduled loan date and time and the required charge amount indicated by the preparation amount information for the reservation ID corresponding to the battery IDs in the to-be-charged battery information, for each of the battery IDs included in that to-be-charged battery information. The determination processor 13 then outputs a charging instruction including these battery IDs and the produced charging target information to the charging devices 20.

Also, the determination processor 13 specifies the records of the reservation IDs included in the to-be-charged battery information, from the reservation table stored by the reservation information storage component 6. The determination processor 13 then updates the loan scheduled battery IDs in the specified records to be the battery IDs corresponding to these reservation IDs in the to-be-charged battery information. Furthermore, the determination processor 13 updates the undetermined number of the specified records to "0."

Processing Flow of Battery Selection Device 1

Figure 2:
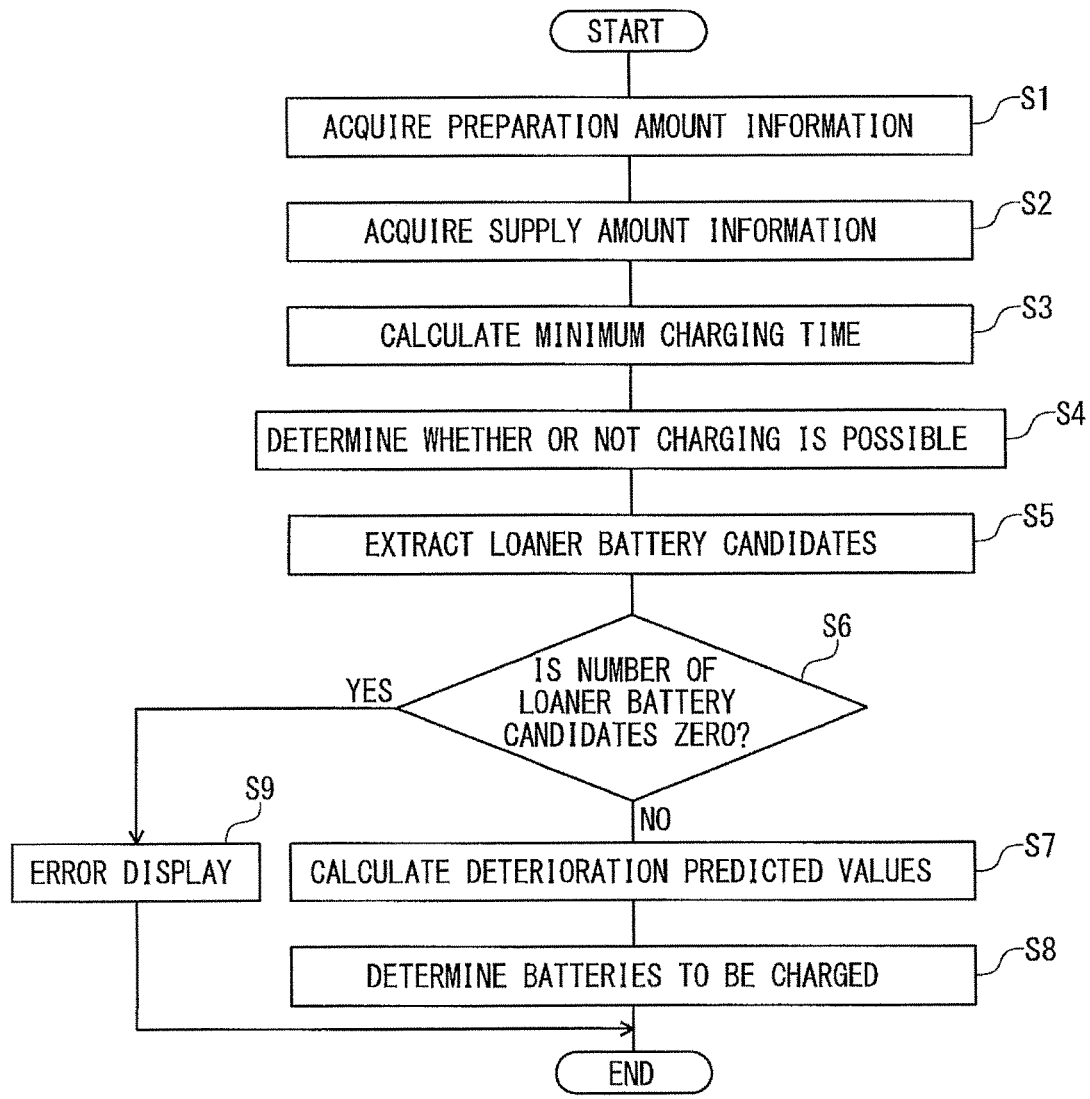
FIG. 2 is a flowchart showing the flow of processing of one or more embodiments of the battery selection device shown in FIG. 1.

The flow of processing in the battery selection device 1 pertaining to one or more embodiments will now be described through reference to FIG. 2. FIG. 2 is a flowchart showing the flow of processing of the battery selection device 1. The battery selection device 1 begins the processing shown in FIG. 2 at a predetermined timing (such as every hour) or at the point when a worker at the charging station inputs a processing start instruction to an input component (not shown). Here, we will describe an example in which a predetermined timing is reached.

Upon reaching the predetermined timing, the preparation amount information acquisition component 3 selects records whose undetermined number is other than "0" from the reservation table stored in the reservation information storage component 6. The preparation amount information acquisition component 3 then produces, for each selected record, preparation amount information in which the reservation ID, scheduled loan date and time, required charge amount, and required number included in that record are associated with each other (S1).

For example, in the case of the reservation table shown in FIG. 3, the preparation amount information acquisition component 3 produces preparation amount information in which the reservation ID of "A100," the scheduled loan date and time of "10 o'clock on Mar. 1, 2015," the required charge amount of "2000 Wh," and the required number of "1" are associated with each other, and preparation amount information in which the reservation ID of "A099," the scheduled loan date and time of "10 o'clock on Mar. 1, 2015," the required charge amount of "2000 Wh," and the required number of "1" are associated with each other. The preparation amount information acquisition component 3 then outputs the produced preparation amount information to the charging determination component 10.

Next, the supply amount information acquisition component 4 produces supply amount information on the basis of the battery information received from the charging devices 20, for the batteries 30 in the selection group excluding batteries 30 determined as scheduled to be loaned out in previous selection processing (S2). As discussed above, the supply amount information is information in which a battery ID, the current SOC of the battery 30 with that battery ID, and an SOH indicating the current deterioration state of that battery 30. The supply amount information acquisition component 4 then outputs the produced supply amount information to the charging determination component 10.

An example will be described here in which the supply amount information acquisition component 4 acquires the supply amount information shown in FIG. 4. The batteries 30 with the battery IDs "a" to "e" shown in FIG. 4 are all batteries with a rating (initial full charge capacity) of 2400 Wh. Accordingly, the battery 30 with the battery ID "a" has a full charge capacity in its current deterioration state of 2040 Wh, which is 2400 Wh×85%, and its current charge amount is 816 Wh, which is 2040 Wh×40%.

Next, battery candidate extraction component 11 calculates the minimum charging time, which is the charging time required to reach the required charge amount indicated by the various sets of preparation amount information (here, 2000 Wh), according to a quick charging model, for the batteries 30 indicated by the battery IDs included in the supply amount information (S3).

FIG. 5 is a graph showing the relation between charging time and charge amount when the charging devices 20 pertaining to one or more embodiments perform charging on the batteries 30. As shown in FIG. 5, the charging device 20 pertaining to one or more embodiments performs constant current charging within an SOC range of up to 90%, and performs constant voltage charging within an SOC range of 90 to 100%. Also, with the charging device 20, the charging speed is variable within an SOC range of up to 90%, and charging is possible at a maximum rate of 3% per minute. Within an SOC range of 90 to 100%, however, the charging device 20 performs charging at ⅙% per minute. That is, a quick charge model with the highest charging rate is a model that charges at 3% per minute within an SOC range of up to 90%, and charges at ⅙% per minute within an SOC range of 90 to 100%.

FIG. 6 shows the minimum charging time calculated for each of the batteries 30 indicated by the battery IDs included in the supply amount information. The battery 30 with the battery ID "b" has an SOH of 80% at the current time, so it is impossible to store an amount of electricity of 2000 Wh, which is the required charge. Accordingly, the battery candidate extraction component 11 does not calculate the minimum charging time for the battery 30 with the battery ID "b."

FIG. 6 shows a case in which the required charge at the scheduled loan date and time is not satisfied unless the battery is charged, but there are situations when some of the batteries 30 in the charging station 100 will satisfy the required charge at the scheduled loan date and time even without charging. That is, there are sometimes batteries 30 in which the charge amount indicated by the supply amount information is over the required charge. In a case such as this, the determination processor 13 calculates the minimum charging time for those batteries as 0 minutes in S3.

Next, the battery candidate extraction component 11 compares the minimum charging time calculated in S3 with the time from the current time of day until the scheduled loan date and time indicated by the preparation amount information. Consequently, it is determined whether or not each battery 30 is able to satisfy the required charge indicated by this preparation amount information at the scheduled loan date and time (hereinafter referred to as a satisfactory battery).

More specifically, the battery candidate extraction component 11 determines a battery 30 to be a satisfactory battery if the time from the current time of day until the scheduled loan date and time is greater than the minimum charging time, and determines any other batteries 30 not to be a satisfactory battery. The battery candidate extraction component 11 also determines batteries 30 for which the minimum charging time has not been calculated because the full charge capacity is less than the required charge not to be a satisfactory battery.

In FIG. 6, a battery capable of satisfying a required charge of "2000 Wh" at a scheduled loan date and time of "10 o'clock on Mar. 1, 2015" as indicated by the preparation amount information including the reservation ID of "A100" is marked as "pass," and a battery that is not capable of this is marked as "fail." Similarly, a battery capable of satisfying a required charge of "2000 Wh" at a scheduled loan date and time of "11 o'clock on Mar. 1, 2015" as indicated by the preparation amount information including the reservation ID of "A099" is marked as "pass," and a battery that is not capable of this is marked as "fail." As shown in FIG. 6, the three batteries 30 with the battery IDs "c," "d," and "e" are capable of storing electricity in an amount of 2000 Wh at 10:00, and the four batteries 30 with the battery IDs "a," "c," "d," and "e" are capable of storing electricity in an amount of 2000 Wh at 11:00.

That is, the satisfactory batteries corresponding to the preparation amount information with the reservation ID of "A100" are the three batteries 30 with the battery IDs of "c," "d," and "e," while the satisfactory batteries corresponding to the preparation amount information with the reservation ID of "A099" are the four batteries 30 with the battery IDs of "a," "c," "d," and "e."

Next, the battery candidate extraction component 11 extracts loaner battery candidates including the total required number indicated by all of the preparation amount information, from among the satisfactory batteries specified in S4 (S5). If there are a plurality of sets of preparation amount information, the battery candidate extraction component 11 extracts loaner battery candidates on the assumption that a battery 30 prepared for a certain preparation amount information cannot be prepared with other preparation amount information.

Here, in any one set of preparation amount information, if the number of corresponding satisfactory batteries is greater than the required number, the battery candidate extraction component 11 extracts a plurality of loaner battery candidates.

For example, if the satisfactory batteries shown in FIG. 6 are identified, the battery candidate extraction component 11 chooses a battery 30 with the required number of "1" indicated by the preparation amount information for the reservation ID of "A100" from among the three batteries 30 with the battery IDs of "c," "d," and "e," which are satisfactory batteries corresponding to the reservation ID "A100."

Then, since a satisfactory battery corresponding to the preparation amount information indicated by the reservation ID "A100" is also a satisfactory battery corresponding to the preparation amount information indicated by the reservation ID "A099," the battery candidate extraction component 11 chooses a required number of "2" indicated by the preparation amount information for the reservation ID "A099" from among three of the four batteries 30 with the battery IDs of "a," "c," "d," and "e" that are satisfactory batteries corresponding to a reservation ID of "A099," with the exclusion of the required number "1" of the preparation amount information with the reservation ID of "A100."

Therefore, the battery candidate extraction component 11 extracts a total of nine loaner battery candidates on the basis of Formula 1 below.

$$_3C_1 \cdot _3C_2 = 9 \quad \text{(Formula 1)}$$

The battery candidate extraction component 11 produces candidate information for each of the loaner battery candidates. This candidate information includes correspondence information (information in which battery ID and reservation ID are associated with each other) of the same number as the total value of the required number indicated by all the preparation amount information.

As mentioned above, a battery 30 prepared for a certain preparation amount information cannot be prepared with other preparation amount information. Accordingly, if the candidate information includes a plurality of sets of correspondence information, the battery candidate extraction component 11 produces candidate information so that the battery IDs included in these sets of correspondence information will all be different from each other.

For example, if the satisfactory batteries shown in FIG. 6 are identified, the battery candidate extraction component 11 produces candidate information corresponding to the nine loaner battery candidates shown in FIG. 7.

In FIG. 7, in each set of candidate information, a battery ID corresponding to a reservation ID of "A100" indicates a candidate for a battery 30 that can be charged up to the required charge by the scheduled loan date and time indicated by the preparation amount information of the reservation ID "A100." A battery ID corresponding to a reservation ID of "A099" indicates a candidate for a battery 30 that can be charged up to the required charge by the scheduled loan date and time indicated by the preparation amount information of the reservation ID "A099."

Next, the battery candidate extraction component 11 determines whether or not the number of loaner battery candidates selected in S5 is 0 (S6). If the number of loaner battery candidates selected in S5 is 0 (Yes in S6), the battery candidate extraction component 11 causes the display component 16 to display an error notification to the effect that a loaner battery candidate cannot be selected (S10). Consequently, upon noting the error notification, a worker at the charging station 100 concludes that there are not enough batteries 30, connects new batteries 30 to charging devices 20, and inputs a processing start instruction to an input component (not shown) so that the battery selection device 1 will start processing again. As a result, the supply amount information acquisition component 4 acquires the supply amount information including the new batteries 30, and the battery candidate extraction component 11 can take the new batteries 30 into account in selecting loaner battery candidates.

On the other hand, if the number of loaner battery candidates selected in S5 is not 0 (No in S6), the flow proceeds to the next step S7.

In S7, the deterioration predicted value calculator 12 calculates the deterioration predicted value, which is the predicted value of the degree of progress in the deterioration of the batteries 30 included in the loaner battery candidates that occurs when the batteries 30 included in the loaner battery candidates are charged up to the required charge by the scheduled loan date and time indicated by the preparation amount information. The deterioration predicted value calculator 12 then produces, for each of the loan battery candidates, deterioration prediction information in which candidate information about the loaner battery candidates and the deterioration predicted values calculated for those loaner battery candidates are associated with each other.

More specifically, the deterioration predicted value calculator 12 produces deterioration prediction information as follows for every set of candidate information outputted from the battery candidate extraction component 11.

First, the deterioration predicted value calculator 12 specifies the SOC and SOH indicated by the supply amount information corresponding to the battery IDs for each of the battery IDs included in the candidate information. Also, the deterioration predicted value calculator 12 reads the reservation IDs corresponding to the battery IDs, and specifies the scheduled loan date and time and the required charge indicated by the preparation amount information for the reservation IDs that were read.

Next, the deterioration predicted value calculator 12 performs a comparison of the specified required charge and the product of multiplying the rating (initial full charge capacity) by the SOC and SOH specified from the supply amount information (that is, the charge amount at the current time) for each of the batteries 30 indicated by the battery IDs included in the candidate information. The deterioration predicted value calculator 12 then determines that any battery 30 for which this product is less than the required charge is a battery that requires charging until the required date and time. The deterioration predicted value calculator 12 further determines that any battery 30 for which this product is at or over the required charge is a battery that does not require charging until the scheduled loan date and time.

The deterioration predicted value calculator 12 starts charging the batteries that require charging, from the charge amount at the current time (that is, the product of multiplying the rating (initial full charge capacity) by the SOC and SOH specified from the supply amount information) according to the charging model shown in FIG. 5, and finds the charging current v when charging so as to reach the required charge by the scheduled loan date and time. The deterioration predicted value calculator 12 also acquires the current temperature u measured by the thermometer 15. The deterioration predicted value calculator 12 then applies a model of deterioration due to charging to the batteries that require charging, and calculates a unit predicted value $d_1$ indicating the degree of progress of deterioration caused by charging, according to the following formula.

$$d_1 = (b(u) \cdot v^2 + c) \times C \quad \text{(Formula 2)}$$

In Formula 2, $b(u)$ is a parameter indicating the extent of progress of deterioration determined by the temperature u measured by the thermometer 15. c is a parameter of deterioration that also occurs when charging is performed at a low current, and C is the charging capacity in a state of 100% SOC (that is, rating (initial full charge capacity)×SOH of supply amount information corresponding to a battery ID indicating a battery that requires charging).

On the other hand, the deterioration predicted value calculator 12 applies a model for deterioration due to being left sitting, and calculates a unit predicted value $d_2$ indicating the degree of progress of deterioration due to being left sitting, for the batteries that do not require charging, according to the following formula.

$$d_2 = a(s,u) \times t \times C \quad \text{(Formula 3)}$$

In Formula 3, s is the SOC of the supply amount information corresponding to a battery ID indicating a battery that does not require charging, and $a(s,u)$ is a parameter indicating the extent of progress of deterioration determined from s and the temperature u measured by the thermometer 15. t is the left-sitting time from the current time until the required date and time, and C is the charging capacity in a state of 100% SOC (that is, rating (initial full charge capacity)×SOH of supply amount information corresponding to a battery ID indicating a battery that does not require charging).

In the example shown in FIG. 6, all satisfactory batteries require charging to reach the required charge by the scheduled loan date and time indicated by the preparation amount information. That is, the batteries 30 included in the loaner battery candidates are all batteries that require charging. Therefore, the deterioration predicted value calculator 12 calculates only the unit predicted value $d_1$ using Formula 2.

In contrast, in FIG. 6, if there is a satisfactory battery for which the minimum charging time is 0 minutes, the deterioration predicted value calculator 12 calculates the unit predicted value $d_2$ using Formula 3 for that satisfactory battery.

Finally, the deterioration predicted value calculator 12 finds a predicted value by computing the unit predicted value $d_1$ or the unit predicted value $d_2$ for each of the batteries 30 indicated by the battery IDs included in the candidate information. In one or more embodiments, the deterioration predicted value calculator 12 uses the sum of the calculated unit predicted values as the deterioration predicted value.

FIG. 8 is a diagram showing an example of deterioration prediction information produced by the deterioration predicted value calculator 12 in S7. In FIG. 8, the candidate information with the candidate number "k" indicates candidate information corresponding to the candidate number "k" in FIG. 7.

However, this is not the only method for computing the deterioration predicted value from the unit predicted value $d_1$ and the unit predicted value $d_2$, and the deterioration predicted value may instead be the average value, median value, etc., of the unit predicted values.

Next, the determination processor 13 determines the batteries to be charged on the basis of the deterioration prediction information produced by the deterioration predicted value calculator 12 in S7 (S8). More specifically, the determination processor 13 acquires the deterioration prediction information produced by the deterioration predicted value calculator 12, and specifies candidate information corresponding to the deterioration predicted value with the least amount of deterioration progress as to-be-charged battery information. For example, with the predicted value information shown in FIG. 8, the determination processor 13 specifies the candidate information with the candidate number "4" as the to-be-charged battery information.

The determination processor 13 determines the batteries 30 indicated by the battery IDs included in the specified to-be-charged battery information as a batteries to be charged, and specifies the reservation IDs corresponding to these battery IDs in the to-be-charged battery information. The determination processor 13 produces charging target information in which the scheduled loan date and time and required charge indicated by the preparation amount information corresponding to the specified reservation IDs are respectively the target date and time and the target charge, and outputs a charging instruction including the battery IDs and the charging target information thus produced to the charging devices 20.

Also, the determination processor 13 updates the undetermined number and the loan scheduled batteries in the record of the reservation IDs included in the to-be-charge battery information, in the reservation table stored by the reservation information storage component 6.

For example, if candidate information with the candidate number "4" shown in FIG. 7 is specified as the to-be-charged battery information, the determination processor 13 updates the category of loan scheduled battery for the record of the reservation ID "A100" from "unspecified" to "d." The determination processor 13 then updates the category of loan scheduled battery for the record of the reservation ID "A099" from "unspecified" to "a" and "c." Further, the determination processor 13 updates the undetermined number for the records of the reservation IDs "A100" and "A099" to "0."

Thus, with the battery selection device 1 in one or more embodiments, the predicted value of the degree of progress of deterioration (deterioration predicted value) of the batteries 30 included in the loaner battery candidates is calculated for each of the loaner battery candidates that can satisfy preparation amount information, and charging is performed on the basis of the deterioration predicted values. Therefore, it is possible to minimize the deterioration of the batteries 30 in the charging station 100.

In one or more embodiments, the supply amount information acquisition component 4 produced supply amount information corresponding to the various batteries 30 in the selection group, with said batteries 30 in the selection group consisting of batteries 30 excluding the loan scheduled batteries 30 determined in previous selection processing (that is, batteries 30 that were already selected for charging) out of the batteries 30 connected to charging devices 20. However, the loan scheduled batteries 30 determined in previous selection processing may be included in the batteries 30 of the selection group.

In this case, the charging determination component 10 may redo the selection processing of loan scheduled batteries 30 (that is, the batteries 30 to be charged), including reservation inputs that determined loan scheduled batteries 30 in previous selection processing. A mode in which the loan scheduled batteries 30 determined in previous selection processing are included in the batteries 30 of the selection group will now be described. For convenience of description, only those functions that are different from the ones in the one or more above embodiments will be described, and functions that are the same will not be described again.

In one or more embodiments, the acquisition component 2 changes all of the undetermined numbers in the records in the reservation table stored in the reservation information storage component 6 to the required numbers for those records a predetermined timing (such as once every hour) or at the point when a worker at the charging station inputs a processing start instruction to an input component (not shown).

Consequently, the supply amount information acquisition component 4 produces supply amount information for each of the batteries 30 in the selection group, so that all the batteries 30 connected to charging devices 20, including the loan scheduled batteries 30 determined in previous selection processing, are batteries 30 in the selection group.

Also, the preparation amount information acquisition component 3 again produces preparation amount information for the records (reservation information) in which loan scheduled batteries have been determined in previous selection processing in the reservation table.

After this, the battery candidate extraction component 11, the deterioration predicted value calculator 12, and the determination processor 13 perform the same processing as in one or more embodiments.

The determination processor 13 may delete (discard) information in the category of loan scheduled batteries of a record if different loan scheduled batteries 30 have been determined for a record in which loan scheduled batteries 30 have been determined in previous selection processing in the reservation table stored in the reservation information storage component 6. The determination processor 13 may then update the battery IDs of the loan scheduled batteries 30 that have been newly determined.

If a charging instruction for a battery ID that is the same as the charging instruction received in previous selection processing is newly received, the charging device controller 23 of the charging device 20 may discard the charging instruction received in previous selection processing and control the power supply 21 according to the newly received charging instruction.

A specific processing example of one or more embodiments will now be described. Here, we will describe a case in which first selection processing (such as at 6 o'clock on Mar. 1, 2015) is followed by second selection processing (such as at 7 o'clock on Mar. 1, 2015). Also, in the first selection processing, the reservation table includes only the record for the reservation ID "X," and batteries 30 with the battery IDs "aa," "bb," "cc," "dd," and "ee" are in the charging station 100. Furthermore, let us assume that a record for a reservation ID "Y" is added in between the first selection processing and the second selection processing, and that no batteries 30 are loaned out during this time.

In the first selection processing, the preparation amount information acquisition component 3 acquires preparation amount information in which the reservation ID "X," the scheduled loan date and time "10 o'clock on Mar. 1, 2015" (hereinafter abbreviated to as "10 o'clock"), the required charge "2000 Wh," and the required number "2" are associated with each other, as preparation amount information for the reservation ID "X." The supply amount information acquisition component 4 then acquires five sets of supply amount information corresponding to the battery IDs "aa," "bb," "cc," "dd," and "ee."

Figure 9:
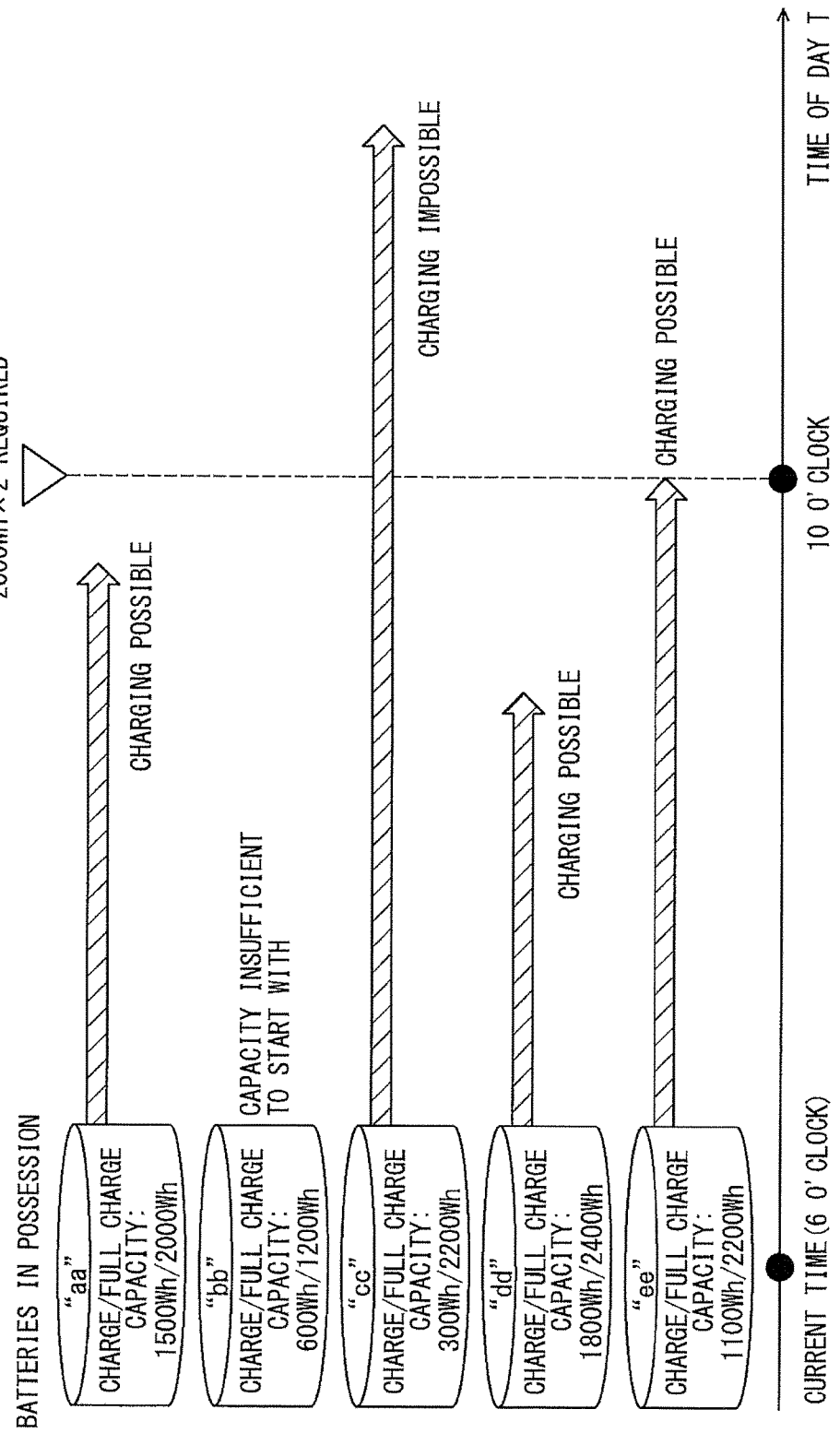
FIG. 9 is a diagram showing processing for specifying satisfactory batteries in first selection processing of the battery selection device in one or more embodiments of the present invention.

FIG. 9 is a diagram showing processing for specifying satisfactory batteries with the battery candidate extraction component 11 in first selection processing. In FIG. 9, the length of the arrow represents the minimum charging time calculated by the battery candidate extraction component 11. As shown in FIG. 9, three batteries 30 with battery IDs of "aa," "dd," and "ee" are specified as satisfactory batteries because their time from the current time to the scheduled loan date and time "10 o'clock" is longer than the minimum charging time. On the other hand, the battery 30 with the battery ID "cc" is specified as not being a satisfactory battery because its time from the current time until the scheduled loan date and time "10 o'clock" is shorter than the minimum charging time. The battery 30 with the battery ID "bb" is specified as not being a satisfactory battery because its full charge capacity is less than the required charge. In this way, the battery candidate extraction component 11 specifies the three batteries 30 with the battery IDs of "aa," "dd," and "ee" as satisfactory batteries that will satisfy the required charge by the scheduled loan date and time indicated by the prepared amount information of the reservation ID "X."

Figure 10:
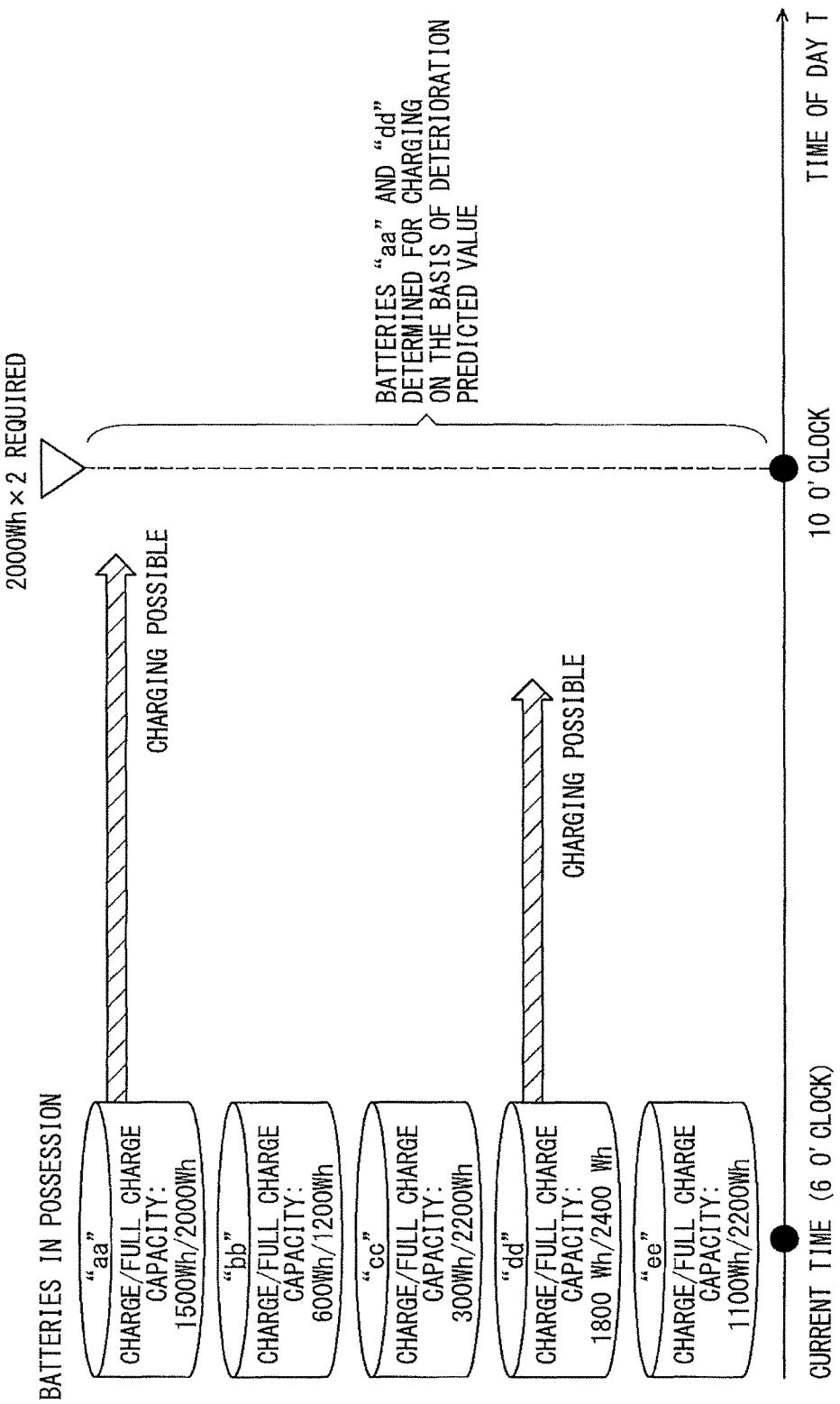
FIG. 10 is a diagram showing processing for determining a battery that is to be loaned out in first selection processing of the battery selection device pertaining to one or more embodiments.

FIG. 10 is a diagram showing processing for determining scheduled loan batteries 30 by the determination processor 13 in first selection processing. The determination processor 13 determines as loan scheduled batteries 30 (that is, batteries 30 that are to be charged) the batteries 30 that are loaner battery candidates corresponding to a deterioration predicted value indicating that the degree of progress of deterioration is lowest, based on the deterioration predicted value calculated by the deterioration predicted value calculator 12. In the example shown in FIG. 10, the determination processor 13 determines the two batteries 30 with the battery IDs "aa" and "dd" as batteries 30 to be charged. At this point, the determination processor 13 updates the loan scheduled battery IDs corresponding to the reservation ID"X" in the reservation table to "aa" and "dd," and updates the undetermined number to "0."

Next, the first selection processing ends, and second selection processing is started in the middle of the charging of the two batteries 30 with the battery IDs "aa" and "dd." The record of the reservation ID "Y" is then added to the reservation table in between the first and second selection processing. Here, let us assume that a record in which a reservation ID of "Y," a scheduled loan date and time of "9 o'clock on Mar. 1, 2015" (hereinafter, abbreviated as "9 o'clock"), a required charge of "1800 Wh," the required number of "1," a loan scheduled battery of "undetermined," and an undetermined number of "1" are associated with each other is added to the reservation table.

In one or more embodiments, in the second selection processing, the acquisition component 2 updates the undetermined number of each record in the reservation table to be the same as the required number. Therefore, the preparation amount information acquisition component 3 acquires preparation amount information for the reservation ID "X" for which the loan scheduled batteries 30 were determined in the first selection processing, and preparation amount information for the reservation ID "Y" that was newly added. That is, the preparation amount information acquisition component 3 maintains the preparation amount information for the reservation ID "X" used in the first selection processing just as it is, and also acquires this information in the second selection processing.

Also, there are no batteries 30 loaned out in between the first selection processing and the second selection processing, the supply amount information acquisition component 4 acquires five sets of supply amount information corresponding to the battery IDs of "aa," "bb," "cc," "dd," and "ee."

Figure 11:
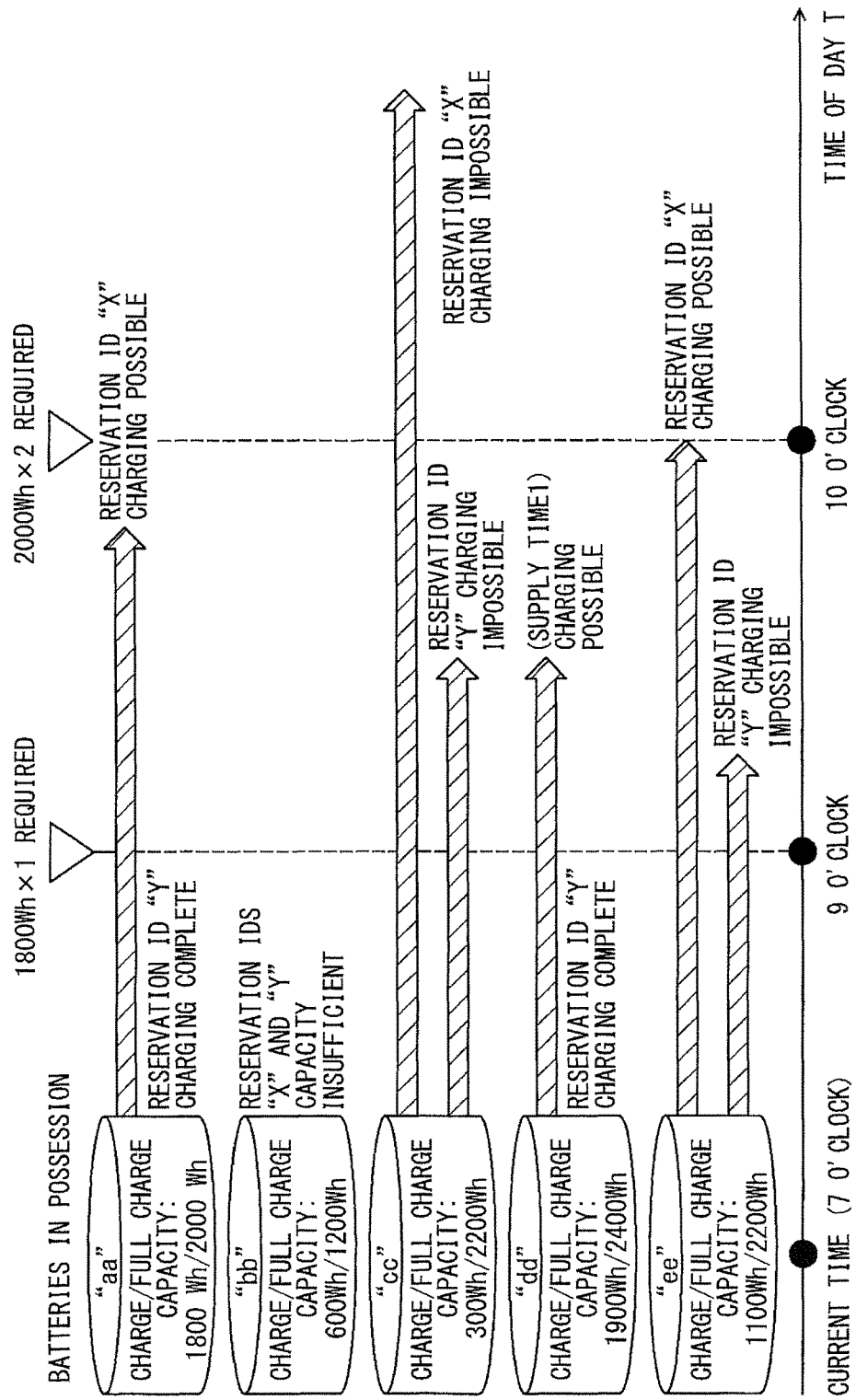
FIG. 11 is a diagram showing processing specifying satisfactory batteries in second selection processing of the battery selection device in one or more embodiments.

FIG. 11 shows the specific processing by the battery candidate extraction component 11 for satisfactory batteries in the second selection processing. As shown in FIG. 11, the three batteries 30 with the battery IDs "aa," "dd," and "ee" have a time from the current time until the scheduled loan date and time of "10 o'clock" that is longer than the minimum charging time, so they are specified as satisfactory batteries corresponding to the preparation amount information for the reservation ID "X." The batteries 30 with the remaining battery IDs of "bb" and "cc" cannot satisfy the required charge indicated by the preparation amount information for the reservation ID "X" by the scheduled loan date and time, so they are specified as not being satisfactory batteries corresponding to the preparation amount information of the reservation ID "X."

On the other hand, the batteries 30 with the battery IDs "aa" and "dd" are specified as satisfactory batteries corresponding to the preparation amount information for the reservation ID "Y" because they already have a charge that is at or above the required charge indicated by the preparation amount information for the reservation ID "Y." The batteries 30 with the remaining battery IDs "bb," "cc," and "ee" are specified as not being satisfactory batteries corresponding to the preparation amount information for the reservation ID "Y" because they cannot satisfy the required charge indicated by the preparation amount information for the reservation ID "Y" by the scheduled loan date and time.

In the example shown in FIG. 11, the battery candidate extraction component 11 makes two choices:

(1) loaner battery candidates A, in which the battery IDs "aa" and "ee" are loaned out for the preparation amount information for the reservation ID "X," and the battery ID "dd" is loaned out for the preparation amount information for the reservation ID "Y," and (2) loaner battery candidates B, in which the battery IDs "dd" and "ee" are loaned out for the preparation amount information for the reservation ID "X," and the battery ID "aa" is loaned out for the preparation amount information for the reservation ID "Y."

FIG. 12 is a drawing showing processing by the determination processor 13 for determining loan scheduled batteries in the second selection processing. Here, the determination processor 13 compares the deterioration predicted values calculated for each of the loaner battery candidates A and loaner battery candidates B mentioned above, and determines those loaner battery candidates corresponding to deterioration predicted values that are lower than the degree of progress of deterioration to be the batteries 30 that will be loaned out. Let us assume here that the deterioration prediction values corresponding to the loaner battery candidates B exhibit a lower progress of deterioration than the deterioration prediction values corresponding to the loaner battery candidates A.

In this case, the determination processor 13 changes the batteries 30 with the battery IDs "dd" and "ee" to the required charge by the scheduled loan date and time indicated by the preparation amount information for the reservation ID "X." Further, the determination processor 13 determines the battery 30 with the battery ID "aa" as a battery 30 to be charged to the required charge by the scheduled loan date and time indicated by the preparation amount information for the reservation ID "X."

With one or more embodiments, in determining the loaner batteries corresponding to newly received reservation inputs, loaner batteries corresponding to other reservation inputs determined in previous selection processing are also included in the batteries 30 to be selected. Consequently, a wider range of loaner batteries can be selected from, and the progress of the overall deterioration of the batteries 30 in the charging station 100 can be further suppressed.

The charging device controller 23 of the charging device 20 may start charging right away upon receiving a charging instruction from the battery selection device 1, or may start charging after a predetermined time has elapsed. This predetermined time is a preset time for charging preparation. Thus, there may be a certain amount of time lag between the point when the battery selection device 1 determines the batteries 30 to be charged and the point when the charging devices 20 actually start charging those batteries 30.

In such a case, batteries that have been determined as scheduled loan batteries 30 in previous selection processing and that have not begun to be charged may be included in the batteries 30 to be selected.

In one or more embodiments, the acquisition component 2 issues a request for the transmission of battery IDs indicating the batteries 30 that have already started charging (hereinafter referred to as charging-started battery IDs) to the charging devices 20 at a predetermined timing (such as every hour) or at the point when a worker at the charging station inputs a processing start instruction to an input component (not shown). The acquisition component 2 then acquires the charging-started battery IDs.

Upon receiving a request for the transmission of the charging-started battery IDs, the charging device controller 23 of the charging device 20 specifies the battery IDs of the batteries 30 to which power is supplied from the power supply 21. The charging device controller 23 then sends the specified battery IDs as charging-started battery IDs to the battery selection device 1.

Upon acquiring the charging-started battery IDs, the acquisition component 2 checks whether there are battery IDs that do not match the received charging-started battery IDs in the category of loan scheduled batteries in the reservation table stored in the reservation information storage component 6. If there are battery IDs that do not match the received charging-started battery IDs in the category of loan scheduled batteries in the reservation table, the acquisition component 2 deletes those battery IDs from the reservation table, and adds the undetermined number of the records corresponding to the number of deleted battery IDs.

Battery IDs that do not match the charging-started battery IDs in the reservation table are battery IDs indicating batteries 30 that have been determined as loan scheduled batteries 30 in previous selection processing, but have not started to be charged. Therefore, the battery selection device 1 includes any batteries 30 that have been determined as loan scheduled batteries 30 in previous selection processing, but have not started to be charged, in the batteries 30 to be selected.

Consequently, as compared with one or more embodiments, the loan scheduled batteries 30 can be selected from a wider range, and the overall progress of deterioration of the batteries 30 in the charging station 100 can be further suppressed.

In one or more embodiments above, the deterioration predicted value calculator 12 calculated unit predicted values for each of the battery candidates only for the batteries indicated by battery IDs included in the candidate information corresponding to battery candidates, and found deterioration predicted values by computing these unit predicted values.

However, batteries 30 other than batteries indicated by the battery IDs included in the candidate information corresponding to the loaner battery candidates are left sitting until the scheduled loan date and time, and deterioration progresses as a result of being left sitting. As shown in Formula 3 above, when the batteries are left sitting, how much the deterioration progresses depends on the SOC. Therefore, it is necessary to compare the overall deterioration of the batteries 30 in the charging station 100 more accurately.

In view of this, in one or more embodiments, the deterioration predicted value calculator 12 calculates unit predicted values for the batteries 30 that are satisfactory batteries and that are indicated by battery IDs not included in the candidate information, in addition to the batteries 30 indicated by the battery IDs included in the candidate information. The deterioration predicted value calculator 12 finds the deterioration predicted values by computing these unit predicted values.

More specifically, the deterioration predicted value calculator 12 may find the unit predicted value $d_2$ according to Formula 3 above for the batteries 30 that are satisfactory batteries and that are indicated by battery IDs not included in the candidate information.

Or, the deterioration predicted value calculator 12 may find the unit predicted value $d_2$ according to Formula 2 above on the basis of the charging current $v_1$ when charging with a slow charging model for batteries 30 that are satisfactory batteries and that are indicated by battery IDs not included in the candidate information, and that are below a specific capacity (such as SOC=80%).

Here, the slow charging model is a model for charging at a specific charging current $v_1$ that is far lower than in a fast charging model. In this case, the determination processor 13 sends the charging devices 20 a charging instruction to charge at the charging current $v_1$ those batteries 30 that are satisfactory batteries, that are indicated by battery IDs not included in the candidate information, and that are below a specific capacity (such as SOC=80%). Consequently, the charging devices 20 change batteries 30 that are not batteries to be charged in order to prepare batteries 30 to satisfy preparation amount information, and that are below a specific capacity (such as SOC=80%), with a slow charging model at the charging current $v_1$. As a result, when new preparation amount information is stored in the reservation information storage component 6, it is easy to prepare batteries 30 that satisfy this preparation amount information.

With one or more embodiments, the unit predicted values are calculated regardless of whether or not each loaner battery candidate is included in the candidate information, for all of the satisfactory batteries. Therefore, a comparison of how much deterioration has progressed overall in all of the satisfactory batteries can be performed more accurately when the satisfactory batteries are and are not included in the candidate information. As a result, loaner battery candidates with less progress of deterioration can be selected more accurately, and the overall deterioration of the batteries 30 in the charging station 100 can be suppressed.

Furthermore, the deterioration predicted value calculator 12 may calculate the unit predicted values not only for the batteries 30 that are loaner battery candidates, but for all of the batteries 30 indicated by the battery IDs included in the supply amount information, and may find deterioration predicted values by computing these unit predicted values.

In one or more embodiments above, the supply amount information acquisition component 4 acquired the current battery information from the batteries 30 connected to the charging devices 20, and that battery information was used directly as the supply amount information. That is, the supply amount information acquisition component 4 produced information related to the current charge and the current deterioration state of the batteries 30 in the charging station 100 at the current time, as supply amount information.

However, the supply amount information acquisition component 4 may produce supply amount information that associates battery IDs with the current SOC and the SOH in the deterioration state at some arbitrary point prior to the required date and time indicated by the preparation amount information, rather than what is related to the batteries 30 at the current time. An example will now be given in which this arbitrary point is 10 minutes after the current time, but this is not the only option.

For example, if charging is started 10 minutes after the current time, the supply amount information acquisition component 4 estimates the SOH and SOC of the batteries 10 minutes after the current time on the basis of the current battery information. The supply amount information acquisition component 4 then produces supply amount information that associates the estimated SOH and SOC with battery IDs.

More specifically, the supply amount information acquisition component 4 estimates the SOH and SOC 10 minutes after the current time by multiplying the SOC and SOH indicated by the current battery information by a specific coefficient. This specific coefficient may be set by experimentally measuring in advance the relation between SOC and SOH and shelf time when batteries are left sitting.

In one or more embodiments, the battery candidate extraction component 11 compares the minimum charging time with the time from a point 10 minutes after the current time until the required time indicated by the prepared amount information. Consequently, the battery candidate extraction component 11 may determine whether or not batteries indicated by the battery IDs included in supply amount information are satisfactory batteries.

Also, the deterioration predicted value calculator 12 may calculate the unit predicted value $d_1$ by finding the charging current $v_1$ when the charging is started at a point 10 minutes after the current time, and the batteries that need to be charged are charged so as to reach the required charge by the required date and time.

In one or more embodiments above, when the time of day at which a loaned battery was returned to the charging station 100 was known, the supply amount information acquisition component 4 produced supply amount information related only to the batteries 30 in the charging station 100 at the current time, but also to the batteries scheduled to be returned between the current time and the required date and time. Consequently, deterioration predicted values indicating the progress of deterioration can be calculated not only for the batteries 30 in the charging station 100, but also for the batteries 30 that are out on loan, making it possible to perform charging with less deterioration to the batteries.

In one or more embodiments, the supply amount information acquisition component 4 acquires from a loan management device (not shown) scheduled return information in which battery IDs for identifying the batteries 30 on loan, the scheduled return date and time, the expected SOC at the time of return, and the SOH at the time of return are associated with each other, for each of these batteries 30.

The supply amount information acquisition component 4 then selects only the scheduled return information in which the scheduled return date and time pertain to the period up to 10 minutes after the present time. The supply amount information acquisition component 4 estimates the SOH at 10 minutes after the current time from the product of multiplying the SOH at the time of loan included in the selected scheduled return information by a specific coefficient. The supply amount information acquisition component 4 also estimates the SOC at 10 minutes after the current time from the product of multiplying the expected SOC at the time of return included in the scheduled return information by a specific coefficient.

The specific coefficient here is set in advance experimentally. The supply amount information acquisition component 4 may then produce supply amount information in which the battery IDs included in the selected scheduled return information, the estimated SOH, and the estimated SOC are associated with each other.

Consequently, the battery candidate extraction component 11 can extract battery candidates that include batteries 30 expected to be returned no later than 10 minutes after the current time.

The loan management device (not shown) may receive the input of the scheduled return date and time and the expected power usage from the user when a battery 30 is loaned out, and produce scheduled return information on the basis of this inputted information and the SOC and SOH of the battery 30 at the time of the loan. The loan management device may send the battery selection device 1 the produced scheduled return information in response to a request from the battery selection device 1.

One or More Other Embodiments (A)

In the one or more above embodiments, the configuration is such that the batteries 30 each comprise a sensor 33, the sensor 33 measures various kinds of information about the cell 32, the battery controller 31 produces battery information in which the SOC indicating the remaining capacity of the battery 30, the SOH indicating the deterioration state of the battery 30, and the battery ID indicating battery identification information are associated with each other, and battery information is supplied to the supply amount information acquisition component 4. However, the present invention is not limited to this.

For example, the configuration may be such that the charging device 20 has a sensor, the sensor of the charging device 20 measures various kinds of information about the cell 32 of the battery 30 connected to the charging device 20, a battery ID indicating battery identification information is acquired from the battery controller 31, battery information is produced, and this battery information is supplied to the supply amount information acquisition component 4.

Also, in the one or more above embodiments, the reservation acceptance component 5 accepted a reservation input, including the required date and time of the battery, the required charge, and the required number, from a user who wanted to borrow a battery 30, and produced a record of a reservation table (reservation information) on the basis of the accepted reservation input.

However, the means for producing records of reservation tables is not limited to this.

For example, the battery selection device 1 may comprise a prediction component for predicting the charge required at the charging station 100 from statistics about past loan history in the charging station 100. That is, the prediction component stores history information about the loan date and time, the number of batteries loaned, and the charge of a loaned battery, in relation to past loans of batteries. The prediction component may then produce a record of a reservation table, and may add to the reservation table of the reservation information storage component 6. For instance, the prediction component may select only history information having the loan date and time between 9 o'clock and 10 o'clock each day, may use the average value (or maximum value) of the total required numbers indicated by the selected history information as the required number, may use the average value (or maximum value) of the charge amount of loaner batteries indicated by the selected history information, and may produce reservation information in which the required date and time is 9 o'clock on the set day.

Also, in the one or more above embodiments, the acquisition component 2 acquired preparation amount information and supply amount information, and the batteries to be charged were selected, at a predetermined timing. However, the timing at which the batteries to be charged are selected is not limited to this. For example, the acquisition component 2 may acquire preparation amount information and supply amount information, and the batteries 30 to be charged may be selected, 1) at the point when a battery 30 is returned to the charging station 100, or 2) the point when the reservation table stored in the reservation information storage component 6 is updated.

Also, the method for calculating the unit predicted values in the deterioration predicted value calculator 12 is not limited to that given in one or more embodiments above. For example, the deterioration predicted value calculator 12 may calculate the unit predicted value $d_1$ according to a formula in which the unit predicted value $d_1$ is dependent on only the charge current $v_1$ (that is, it does not depend on the temperature u).

(B)

In the one or more above embodiments, an example was given in which the batteries 30 to be charged were determined on the basis of predicting the degree of progress of deterioration during charging, from among a plurality of batteries 30 that were loaned out to electric vehicle such as electric cars, but the present invention is not limited to this.

For example, in addition to an electric car, the vehicle in which the battery is installed can be an electric motorcycle, an electric unicycle, an electric bicycle, a motor-assisted bicycle, a PHV (plug-in hybrid vehicle), or some other such vehicle.

Also, the power consuming unit in which the battery is installed is not limited to a vehicle, and may also be other electrical products that are driven by exchangeable batteries.

Examples of these electrical products include refrigerators, washing machines, vacuum cleaners, rice cookers, electric kettles, and other such household appliances that run on electricity supplied by a battery pack.

Furthermore, the power consuming unit in which the battery is installed may be a power tool.

In this case, the battery used in the power tool is charged at a battery station or the like where a plurality of batteries that can be loaned out are charged. One or more embodiments may be selecting and charging batteries in which the battery deterioration during charging will be as low as possible.

Example of Implementation by Software

The control blocks of the battery selection device 1 (particularly the preparation amount information acquisition component 3, the supply amount information acquisition component 4, the battery candidate extraction component 11, the deterioration predicted value calculator 12, and the determination processor 13) may be realized by a logic circuit (hardware) formed on an integrated circuit (IC chip) or the like, or it may be realized by software using a CPU (central processing unit).

In the latter case, the battery selection device 1 comprises a CPU that executes the commands of a program, which is software for carrying out various functions, a ROM (read only memory) or a storage device (these are referred to as "recording media") in which the above-mentioned program and various kinds of data are recorded so as to be readable by a computer (or CPU), a RAM (random access memory) for developing the program, etc. The computer (or CPU) then reads the program from the recording medium and executes the program. The recording medium can be a "non-transitory tangible medium," such as a tape, disk, card, semiconductor memory, or programmable logic circuit. Also, the above-mentioned program may be supplied to the computer via any transmission medium capable of transmitting the program (a communication network, a broadcast wave, etc.). The one or more embodiments of the present invention may also be realized in the form of a data signal embedded in a carrier wave, in which the program is embodied by electronic transmission.

The present invention is not limited to or by the above embodiments, and various modifications are possible within the scope of the claims. Embodiments obtained by appropriately combining the technical means disclosed in different embodiments are also included in the technical scope of the present invention. Although the disclosure has been described with respect to a limited number of embodiments, those skilled in the art, having the benefit of this disclosure, will appreciate that various other embodiments may be devised without departing from the scope of the present invention.

INDUSTRIAL APPLICABILITY

One or more embodiments of the present invention can be utilized in stations used to swap batteries from electric vehicles.

REFERENCE SIGNS LIST 1 battery selection device
3 preparation amount information acquisition component
4 supply amount information acquisition component
5 reservation acceptance component
6 reservation information storage component
11 battery candidate extraction component
12 deterioration predicted value calculator
13 determination processor
16 display component
20 charging device
30 battery
100 charging station

The invention claimed is:

1. A battery selection device that selects which of a plurality of batteries in a charging station to charge at a time of selection, the battery selection device comprising:
   a supply amount information acquisition component acquiring supply amount information including information about a full charge capacity and a remaining capacity at the time of selection for each of the plurality of batteries;
   a preparation amount information acquisition component acquiring preparation amount information indicating a preparation remaining capacity, which is the remaining capacity required of a loaner battery when that battery is loaned out at a scheduled loan time that is after the time of selection;
   a battery extraction component extracting, as loaner battery candidates from the plurality of batteries, batteries having sufficient charge to be charged up to the preparation remaining capacity by the scheduled loan time, on the basis of the supply amount information and the preparation amount information; and
   a determination component determining a loaner battery on the basis of a predicted progress of deterioration of batteries as a result of charging the loaner battery candidates up to the preparation remaining capacity by the scheduled loan time when there are a plurality of loaner battery candidates, and determine that loaner battery for charging.

2. The battery selection device according to claim 1, wherein the plurality of batteries that are objects of selection do not include any batteries that have already been determined for charging in a previous selection at the scheduled loan time.

3. The battery selection device according to claim 1, wherein the plurality of batteries that are objects of selection include a battery that has already been determined for charging in a previous selection at the scheduled loan time.

4. The battery selection device according to claim 1, wherein the plurality of batteries that are objects of selection include a battery that has already been determined for charging in a previous selection at the scheduled loan time, and whose charging has already begun.

5. The battery selection device according to claim 3, wherein the preparation amount information acquisition component acquires preparation amount information by taking over the preparation amount information for batteries that have already been determined for charging in a previous selection.

6. The battery selection device according to claim 3, wherein the determination component discards this previous determination if a battery that has already been determined for charging in a previous selection is determined for charging.

7. The battery selection device according to claim 1, wherein the battery extraction component outputs an error notification in an event that the loaner battery candidate is not extracted.

8. The battery selection device according to claim 1, wherein the scheduled loan time includes a first scheduled loan time and a second scheduled loan time, the preparation amount information acquisition component acquires, as the preparation amount information, first preparation amount information indicating a first preparation remaining capacity, which is the remaining capacity required for a first loaner battery when that battery is loaned out at the first scheduled loan time, and second preparation amount information indicating a second preparation remaining capacity, which is the remaining capacity required for a second loaner battery when that battery is loaned out at the second scheduled loan time, the battery extraction component extracts, as loaner battery candidates from the plurality of batteries, a first loaner battery candidate that is a battery having sufficient charge to be charged up to the first preparation remaining capacity by the first scheduled loan time, and a second loaner battery candidate that is a battery having sufficient charge to be charged up to the second preparation remaining capacity by the second scheduled loan time, on the basis of the supply amount information and the preparation amount information, and on the condition that the first loaner battery and the second loaner battery will be determined so as to be mutually different batteries, when there are a plurality of first loaner battery candidates, the determination component determines the first loaner battery on the basis of the predicted progress of deterioration of these first loaner battery candidates when they are charged up to the first preparation remaining capacity by the first scheduled loan time, and when there are a plurality of second loaner battery candidates, the determination component determines the second loaner battery on the basis of the predicted progress of deterioration of these second loaner battery candidates when they are charged up to the second preparation remaining capacity by the second scheduled loan time.

9. The battery selection device according to claim 4, wherein the determination component discards this previous determination if a battery that has already been determined for charging in a previous selection is determined for charging.

10. The battery selection device according to claim 5, wherein the determination component discards this previous determination if a battery that has already been determined for charging in a previous selection is determined for charging.

11. The battery selection device according to claim 2, wherein the battery extraction component outputs an error notification in an event that the loaner battery candidate is not extracted.

12. The battery selection device according to claim 3, wherein the battery extraction component outputs an error notification in an event that the loaner battery candidate is not extracted.

13. The battery selection device according to claim 4, wherein the battery extraction component outputs an error notification in an event that the loaner battery candidate is not extracted.

14. The battery selection device according to claim 5, wherein the battery extraction component outputs an error notification in an event that the loaner battery candidate is not extracted.

15. The battery selection device according to claim 6, wherein the battery extraction component outputs an error notification in an event that the loaner battery candidate is not extracted.

16. A battery selection method, for selecting which of a plurality of batteries located in a charging station is to be charged at a time of selection, the battery selection method comprising:

acquiring supply amount information including information about a full charge capacity and a remaining capacity at the time of selection for each of the plurality of batteries;

acquiring preparation amount information indicating a preparation remaining capacity, which is the remaining capacity required of a loaner battery when that battery is loaned out at a scheduled loan time that is after the time of selection;

extracting, as loaner battery candidates from the plurality of batteries, batteries having sufficient charge to be charged up to the preparation remaining capacity by the scheduled loan time, on the basis of the supply amount information and the preparation amount information; and determining a loaner battery on the basis of a predicted progress of deterioration of batteries as a result of charging the loaner battery candidates up to the preparation remaining capacity by the scheduled loan time when there are a plurality of loaner battery candidates, and determining that loaner battery for charging.

17. A non-transitory computer-readable recording medium on which a program is recorded, the program causing a computer to execute a battery selection method, for selecting which of a plurality of batteries located in a charging station is to be charged at a time of selection, the battery selection method comprising:

acquiring supply amount information including information about a full charge capacity and a remaining capacity at the time of selection for each of the plurality of batteries;

acquiring preparation amount information indicating a preparation remaining capacity, which is the remaining capacity required of a loaner battery when that battery is loaned out at a scheduled loan time that is after the time of selection;

extracting, as loaner battery candidates from the plurality of batteries, batteries having sufficient charge to be charged up to the preparation remaining capacity by the scheduled loan time, on the basis of the supply amount information and the preparation amount information; and determining a loaner battery on the basis of a predicted progress of deterioration of batteries as a result of charging the loaner battery candidates up to the preparation remaining capacity by the scheduled loan time when there are a plurality of loaner battery candidates, and determining that loaner battery for charging.

* * * * *